United States Patent Office 3,026,338
Patented Mar. 20, 1962

3,026,338
$\Delta^1$ - ALLOPREGNENE - 11$\alpha$,21 - DIOL - 3,20 - DIONE, ESTERS THEREOF, AND THE CORRESPONDING $\Delta^{1,4}$-DERIVATIVES
Carl Djerassi, Birmingham, Mich., and George Rosenkranz, Mexico City, Mexico, assignors to Syntex S.A., Mexico City, Mexico, a corporation of Mexico
No Drawing. Filed Feb. 15, 1956, Ser. No. 565,556
Claims priority, application Mexico Mar. 7, 1952
10 Claims. (Cl. 260—397.45)

The present invention relates to novel cyclopentanophenanthrene derivatives and to a method for the preparation thereof.

More particularly, the present invention relates to ring A unsaturated compounds of the pregnene and allopregnene series having 11$\alpha$ and 21-hydroxy groups and 3 and 20-keto groups, as well as to esters thereof having cortical hormone activity.

In accordance with the present invention, it has been discovered that allopregnane-11$\alpha$,21-diol-3,20-dione and its esters may be converted into the novel $\Delta^1$-allopregnene-11$\alpha$,21-diol-3,20-dione and esters thereof and the corresponding $\Delta^{1,4}$-isomers.

The products of the present novel process just referred to have therapeutic hormone activity, especially of the type characterizing the adrenal cortical steroid hormones cortisone and corticosterone for example. Further, since the 11$\alpha$-hydroxy group of these compounds may be readily oxidized with chromic acid, for example, they are also intermediates for the production of corresponding ring A unsaturated pregnane compounds of 11-dehydrocorticosterone, i.e., $\Delta^1$-allopregnene-21-ol-3,11,20-trione and its esters, and $\Delta^{1,4}$-allopregnadiene-2-ol-3,11,20-trione and its esters. These compounds are also active cortical hormones.

The brominated derivatives of allopregnane-11$\alpha$,17$\alpha$-diol-3,20-dione and/or its esters, may be utilized for the production of novel ring A unsaturated steroids such as the corresponding $\Delta^1$ and $\Delta^{1,4}$-derivatives, in accordance with the following equations:

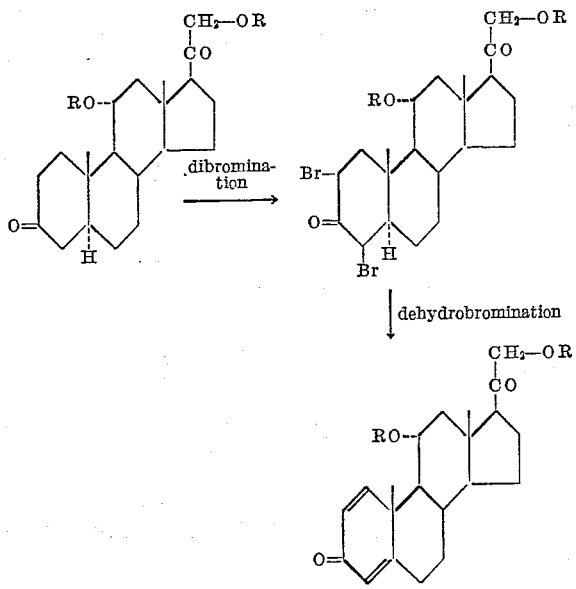

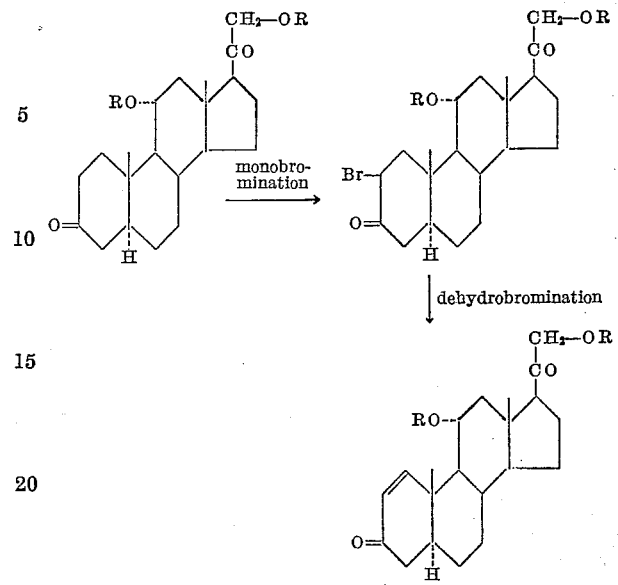

In the above equations, R represents the residue of a hydrocarbon carboxylic acid of less than 10 carbon atoms, especially the residues of lower fatty acids and benzoic acid.

In proceeding in accordance with the above equations, the starting material which may be a suitable ester, such as the 11,21-diacetate of allopregnan-11$\alpha$,21-diol-3,20-dione prepared in accordance with our United States application Serial No. 335,585, filed February 6, 1953, now U.S. Patent No. 2,825,735 issued March 4, 1958, is treated either with one molar equivalent of bromine or two molar equivalents, depending upon whether the 2-bromo derivative is desired or the 2,4-dibromo derivative. Thereafter, these bromo derivatives are subjected to dehydrobromination by treatment with the dehydrobrominating agent, i.e., a tertiary amine, such as lutidine or collidine, or by suitable agent such as pyruvic acid to prepare the corresponding di-esters of $\Delta^1$-allopregnene-11$\alpha$,21-diol-3,20-dione or a $\Delta^{1,4}$-pregnadiene-11$\alpha$,21-diol-3,20-dione. Conventional saponification of these esters as by refluxing with dilute alcoholic base then produced the corresponding free compounds. The corresponding 21-monoesters, particularly hydrocarbon carboxylic esters of less than 10 carbon atoms including those types of ester conventionally known as derivatives of steroid alcohols, were then prepared by conventional mild acylation procedures involving the use of slightly over 1 equivalent of acylating agent at low temperatures. These included particularly, for example, the lower fatty acid esters and benzoic acid esters.

For the preparation of the corresponding 11-keto compounds, the 21-monoesters just described were then treated with an oxidizing agent for 11-hydroxy groups, such as chromium trioxide. By this method there was prepared the corresponding 21-monoester of $\Delta^1$-allopregnene-21-ol-3,11,20-trione and the 21-monoester of $\Delta^{1,4}$-pregnadiene-2-ol-3,11,20-trione, both active cortical hormones. The free compounds prepared by conventional saponification with alcoholic base were also active.

The following specific examples serve to illustrate, but are not intended to limit the present invention:

Example I

A solution of 1 g. of allopregnane-11α,21-diol-3,20-dione diacetate in 60 cc. of glacial acetic acid was mixed with three drops of a 4-normal solution of hydrogen bromide in acetic acid and then a solution of 1.05 molar equivalents of bromine in acetic acid was added dropwise and under mechanical stirring. After the solution had decolorized completely, it was diluted with water and the precipitate was collected, washed with water and air dried. The product was 2-bromo-allopregnane-11α,21-diol-3,20-dione.

Example II

A solution of 1 g. of the 2-bromo compound obtained according to Example I, in 7 cc. of gamma-collidine was refluxed for 45 minutes. The cooled mixture was filtered from the collidine hydrobromide formed (its weight corresponded to 0.97 molar equivalents), the precipitate was washed with ether and the filtrate was diluted with more ether, washed with dilute hydrochloric acid, sodium carbonate solution and water, dried over sodium sulphate and evaporated to dryness. In order to purify the compound, it was dissolved in a mixture of benezene-hexane and the solution was passed through a column with 3 g. of alumina previously washed with ethyl acetate. Recrystallization from ethyl acetate yielded $\Delta^1$-allopregnene-11α,21-diol-3,20-dione.

In the above experiment, gamma-collidine can be substituted by 2,6-lutidine with the same results.

Saponification of the diacetate by refluxing with 1% ethanolic potassium hydroxide during 1 hour and working up in the usual way afforded the free $\Delta^1$-allopregnene-11α,21-diol-3,20-dione. Acetylation of this compound with 1.1 mols of acetic anhydride in pyridine solution at a temperature of −10° C., during 2 days gave $\Delta^1$-allopregene-11α,21-diol-3,20-dione 21-monoacetate.

Example III

A solution of 1 g. of the 2-bromo compound obtained according to Example I, 0.75 g. of semicarbazide hydrochloride and 0.8 g. of sodium acetate trihydrate (previously dissolved in 0.5 cc. of water) in 150 cc. of acetic acid was heated for 2 hours at a temperature 60° C., under atmosphere of nitrogen. After this time, 10 cc. of pyruvic acid, 3 g. of sodium acetate and 20 cc. of water were added and the temperature of the mixture was raised to 75° C. After 2 hours, 4 additional cc. of pyruvic acid were added and the mixture was kept standing overnight. Next day it was diluted with much water and the precipitate was extracted with chloroform, washed with sodium bicarbonate and water, dried over sodium sulphate and evaporated to dryness, thus giving $\Delta^1$-allopregnene-11α,21-diol-3,20-dione diacetate identical to the one obtained according to Example II.

Example IV

A solution of 2 g. of the 2-bromo derivative obtained according to Example I and 1.1 molar equivalents of 2,4-dinitrophenylhydrazine in 50 cc. of glacial acetic acid was heated at 100° C., for 5 minutes, the mixture was cooled and the crystals of the orange dinitrophenylhydrazone formed were collected and washed with alcohol. 1 g. of this compound was dissolved in 50 cc. of chloroform and then mixed with 75 cc. of 85% pyruvic acid and 6 cc. of a 4-normal solution of hydrogen bromide in acetic acid. After heating for 3 hours at 60° C., under atmosphere of nitrogen, the mixture was diluted with chlorofrom and the chloroform layer was washed with water, sodium carbonate solution and water, dried over sodium sulphate and evaporated to dryness. After one crystallization from ethyl acetate, $\Delta^1$-allopregnene-11α,21-diol-3,20-dione diacetate was obtained, identical to the one obtained according to Example II.

Example V

A solution of 2 g. of allopregnane-11α,21-diol-3,20-dione diacetate in 100 cc. of glacial acetic acid containing 5 drops of a 4-normal solution of hydrogen bromide in acetic acid was treated dropwise at 20° C., under mechanical stirring with a solution of 2 molar equivalents of bromine in 5 cc. of glacial acetic acid which was added in a period of 15 minutes. 1 additional cc. of the hydrogen bromide solution was added and the solution was kept overnight at room temperature in order to complete the rearrangement of the 2,2′-dibromo configuration into the more stable 2,4-dibromo configuration. Next day the mixture was diluted with water and the precipitate of 2,4-dibromo-allopregnane-11α,21-diol-3,20-dione was collected, washed and air dried.

Example VI

A solution of 1 g. of the 2,4-dibromo compound obtained according to Example V, in 8 cc. of collidine was refluxed for 40 minutes and then treated by the procedure described in Example II. After one crystallization from ethyl acetate, $\Delta^{1,4}$-pregnadiene-11α,21-diol-3,20-dione diacetate was obtained.

Saponification by the method described in Example II yielded the free $\Delta^{1,4}$-pregnadiene-11α,21-diol-2,20-dione and monoacetylation of this compound by the method described in Example II gave $\Delta^{1,4}$-pregnadiene-11α,21-diol-3,20-dione 21-monoacetate.

Example VII 100 mg. of $\Delta^{1,4}$-pregnadiene-11α-diol-3,20-dione 21-monoacetate of Example VI in 3 cc. of acetic acid was cooled to 14° C. and then treated with a solution of 20 mg. of chromium trioxide (slightly over 1 molar equivalent of active oxygen) in 8 cc. of glacial acetic acid which was previously cooled to 14° C. The mixture was kept standing at room temperature for 5 minutes and then poured into 200 cc. of 5% sodium bisulfite solution extracted with chloroform and then the chloroform extract was evaporated to dryness. The residue was then purified by chromatography to give the 21-monoacetate of $\Delta^{1,4}$-pregnadiene-21-ol-3,11,20-trione an active cortical hormone. Saponification by the method of Example II gave the active free hormone $\Delta^{1,4}$-pregnadiene-21-ol-3,11,20-trione monoacetylation with an acylating agent, i.e., lower fatty acid acylating agents, for example, anhydrides and pyridine gave the corresponding esters such as a propionate or butyrate. Similarly, the action of other acylating agents of other hydrocarbon carboxylic acids having in general less than 10 carbon atoms, such as benzoic or cyclopentyl propionic, gave the corresponding esters.

Oxidation under precisely the same conditions just outlined applied to the 21-monoacetate of $\Delta^1$-allopregnene-11α,21-diol-3,20-dione of Example II, similarly gave the 21-acetate of $\Delta^1$-allopregnene-21-ol-3,11,20-trione which also possessed cortical hormone activity. Similar saponification of this last mentioned 21-acetate gave the free compound and similar acylation as outlined above gave the corresponding esters of hydrocarbon carboxylic acids of less than about 10 carbon atoms.

The present application is a continuation-in-part of United States application Serial No. 340,898, filed March 6, 1953, now U.S. Patent No. 2,735,855 issued February 21, 1956.

We claim:

1. A new compound selected from the class consisting of $\Delta^1$-allopregnene-11α,21-diol-3,20-dione, esters thereof of hydrocarbon carboxylic acids of less than 10 carbon atoms, $\Delta^{1,4}$-pregnadiene-11α,21-diol-3,20-dione and esters thereof of hydrocarbon carboxylic acids of less than 10 carbon atoms.

2. $\Delta^1$-allopregnene-11α,21-diol-3,20-dione.

3. $\Delta^1$-allopregnene-11α,21-diol-3,20-dione 21-monoacetate.

4. Δ¹-allopregnene-11α,21-diol-3,20-dione 11,21-diacetate.

5. Δ¹,⁴-pregnadiene-11α,21-diol-3,20-dione.

6. Δ¹,⁴-pregnadiene-11α,21-diol-3,20-dione 21-monoacetate.

7. Δ¹,⁴-pregnadiene-11α,21-diol-3,20-dione 11,21-diacetate.

8. Δ¹-allopregnene-21-ol-3,11,20-trione.

9. Δ¹-allopregnene-21-ol-3,11,20 - trione 21 - monoacetate.

10. A new compound selected from the class consisting of Δ¹-allopregnene-21-ol-3,11,20-trione and esters thereof of hydrocarbon carboxylic acids of less than 10 carbon atoms.

References Cited in the file of this patent
UNITED STATES PATENTS

| | | |
|---|---|---|
| 2,703,805 | Rosenkranz | Mar. 8, 1955 |
| 2,735,855 | Djerassi | Feb. 21, 1956 |
| 2,736,734 | Sarett | Feb. 28, 1956 |

OTHER REFERENCES

Fieser and Fieser: Natural Products Related to Phenanthrene (3rd edit., 1949), pages 262–264 and 418.